UNITED STATES PATENT OFFICE.

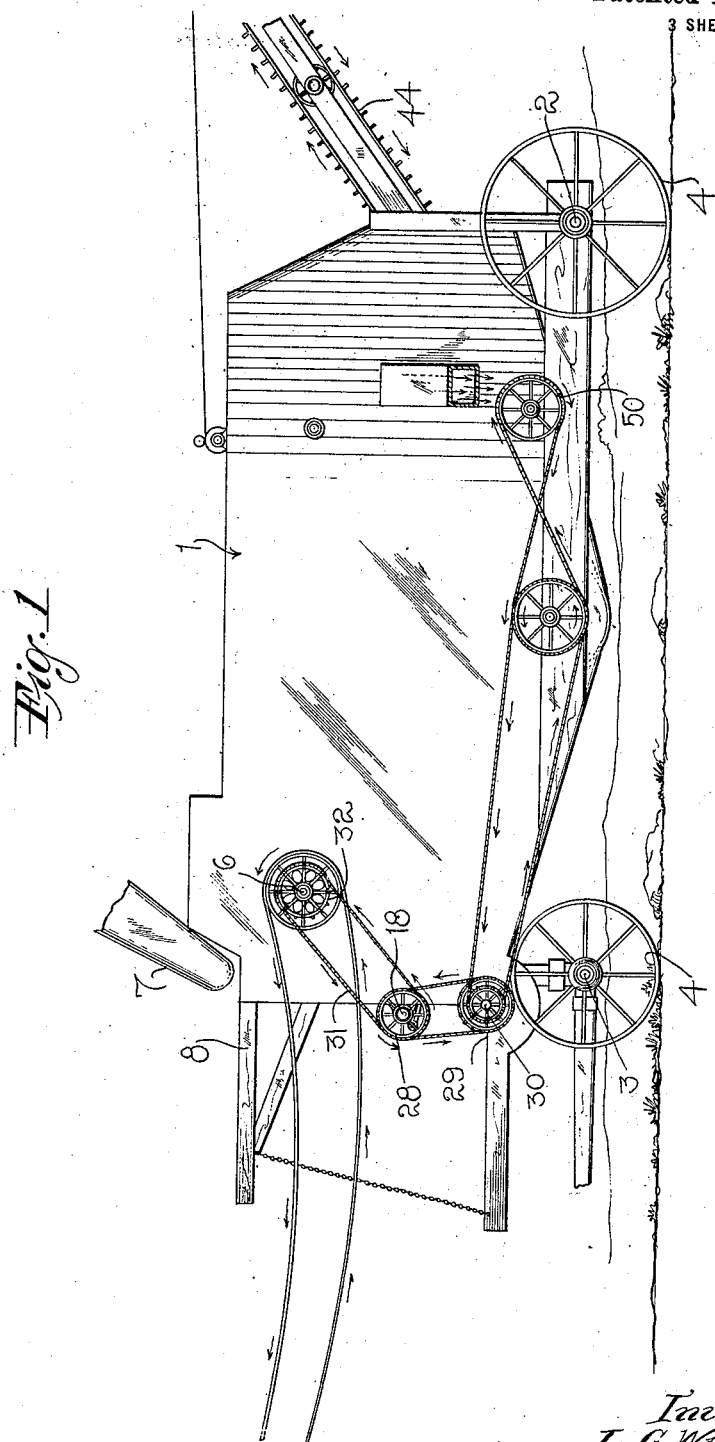

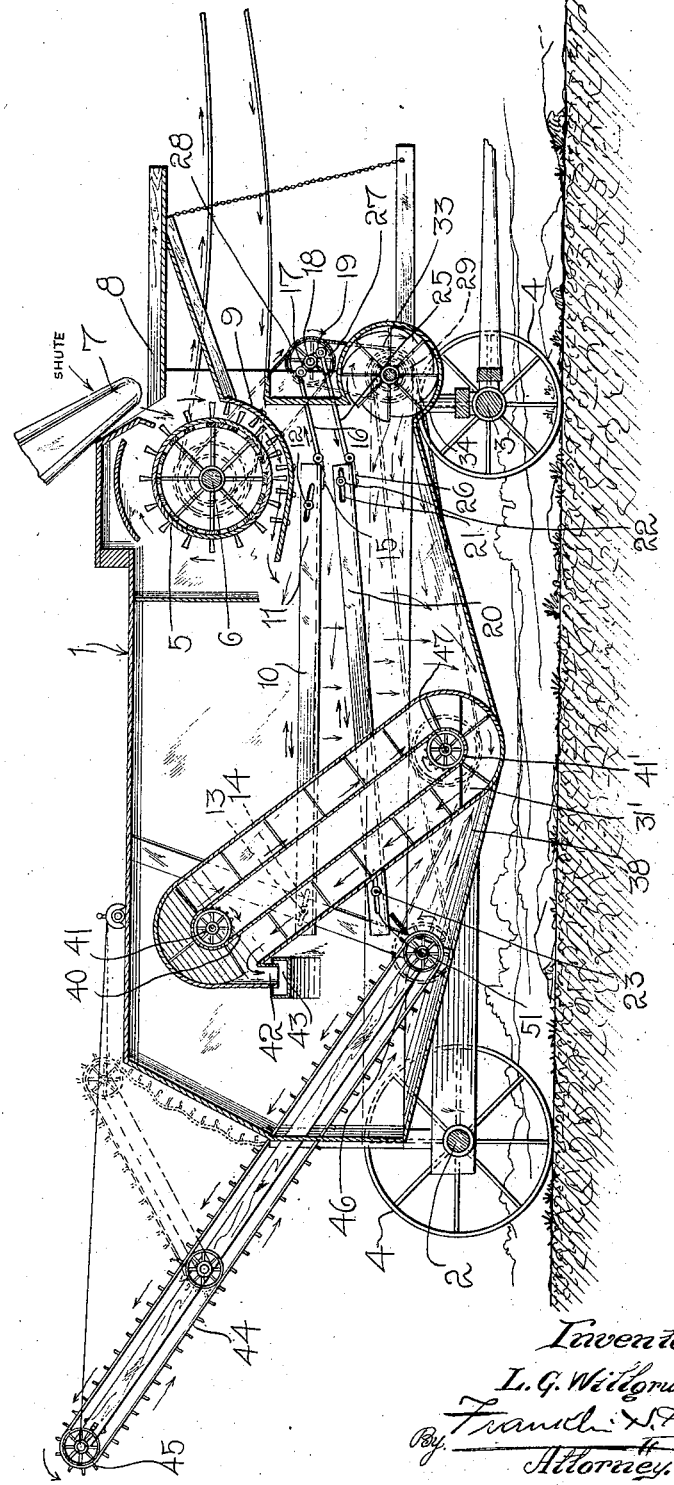

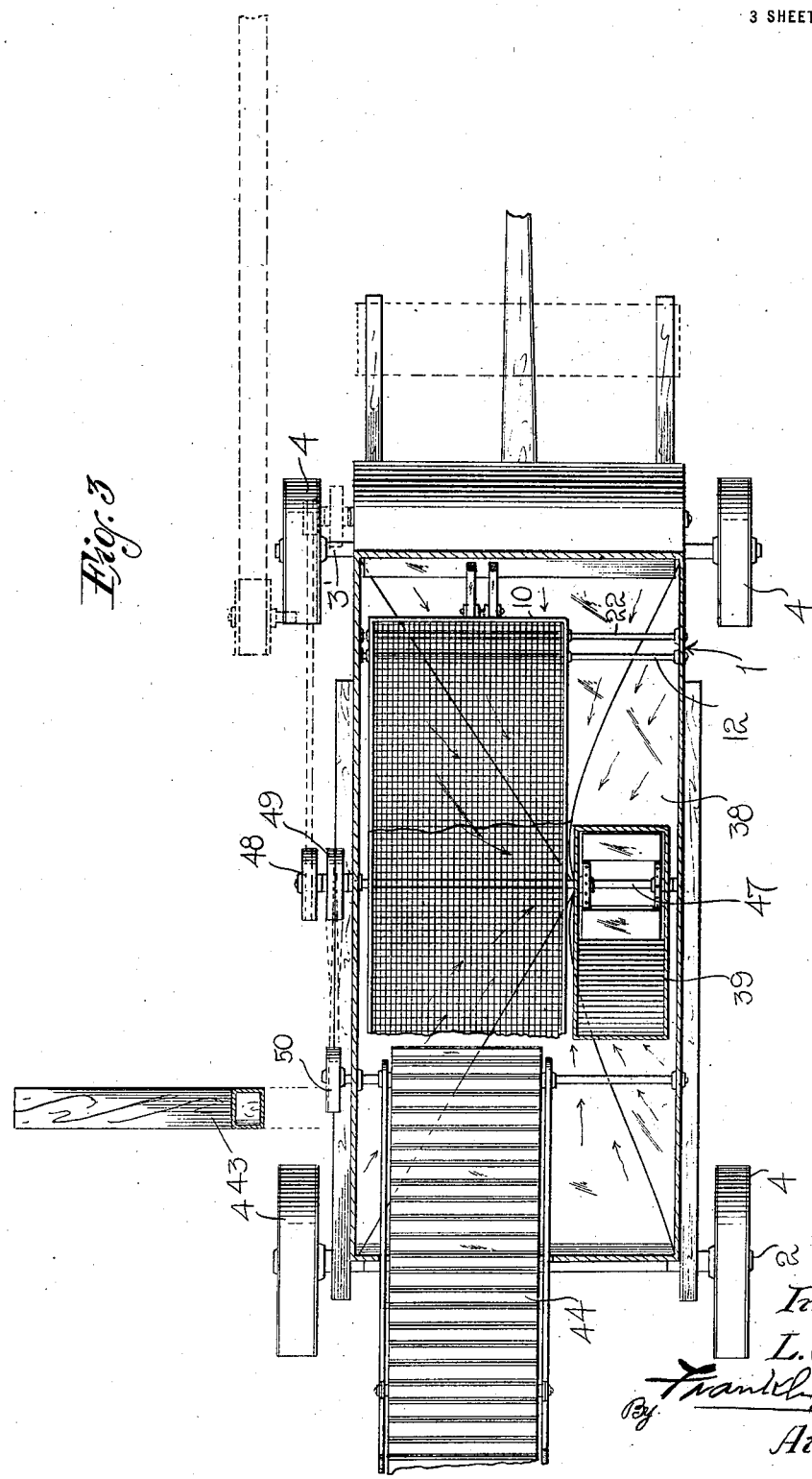

LEONARD G. WILLGRUBS, OF SPARTA, WISCONSIN.

BEAN-THRESHER.

1,377,041. Specification of Letters Patent. Patented May 3, 1921.

Application filed August 7, 1919. Serial No. 315,878.

*To all whom it may concern:*

Be it known that I, LEONARD G. WILLGRUBS, a citizen of the United States, residing at Sparta, in the county of Monroe and State of Wisconsin, have invented certain new and useful Improvements in Bean-Threshers; and I do hereby declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to new and useful improvements in bean threshers, and consists of a simple and efficient apparatus of this nature having various details of construction, combination and arrangement of parts which will be hereinafter fully described, shown in the accompanying drawings and then specifically defined in the appended claim.

My invention is illustrated in the accompanying drawings which, with the numerals of reference marked thereon, form a part of this application, and in which:

Figure 1 is a side elevation of my improved bean thresher.

Fig. 2 is a central vertical sectional view through the same, parts being shown in elevation, and Fig. 3 is a horizontal sectional view, parts being shown in plan.

Reference now being had to the details of the drawings by numerals:

1 designates the casing of the thresher having axles 2 and 3 on which the wheels 4 are journaled. The thresher is provided with a cylinder 5 mounted upon the shaft 6, and 7 is a chute through which the vines containing the pods of the beans are inserted and adapted to fall upon the platform 8 from which they are fed against the teeth of the cylinder underneath which is a concave 9.

Mounted within the casing is a vibrating screen 10 having elongated inclined slots 11 formed in the opposite side walls thereof and adapted to receive the shaft 12, shown clearly in top plan view in Fig. 3, said shaft being mounted in the opposite walls of the casing. A similar shaft 13, shown in dotted lines in Fig. 2 of the drawings, passes through inclined slots 14, also shown in dotted lines in Fig. 2, and which support the screen and permit the same to have a longitudinal movement.

A plate 15 is secured to the forward end of the screen 10, and 16 is a rod pivotally connecting said plate to an arm 17 fixed to the shaft 18 journaled in suitable bearings in the frame of the apparatus.

A second vibrating screen 20 is provided with slots 21 in the side walls near its forward end and through which slots a shaft 22 passes which is mounted in the opposite walls of the thresher. A shaft 23, shown in Fig. 2, is also mounted in the opposite walls of the thresher and passes through elongated slots 24 formed in the side walls of the thresher near its rear end. A rod 25 is pivotally connected to a plate 26 at the forward end of the screen 20, said rod 25 being connected to an arm 27 mounted upon the shaft 18.

A sprocket wheel 28 is fixed to the shaft 18 and has sprocket chain connection with a sprocket wheel 29 fixed to the shaft 30, and 31 is a chain passing about the sprocket wheel fixed to the shaft 18 and also about a sprocket wheel 32 fixed to the cylinder shaft 6. A fan 33 is fixed to rotate with the shaft 30 and is mounted within a suitable casing 34.

The bottom 38 of the threshing machine, as shown in the drawings, has inclined walls, and it will be noted upon reference to Fig. 3, that the screens are positioned at one side of the machine, leaving a space in which an elevator casing 39, having an opening in the side wall thereof at its lower end, as shown in Fig. 2 of the drawings, is mounted in which an endless conveyer 40 travels about sprocket wheels 41 and 41' serves as means for elevating the beans which have been threshed and also the chaff and which are discharged through the exit opening 42 into the trough 43. A second endless conveyer 44 passes over sprocket wheels 45 and 46 and which conveyer is made up of sections and adapted to fold in the manner shown in Fig. 2 of the drawings when not in use.

The sprocket wheel 41 is fixed to a shaft 47 carrying a pulley 48, shown in Fig. 3, and adapted to have belted connections with the fan shaft 25, and a second pulley 49 is fixed to the shaft 47 and has belted connection with a pulley 50 which is fixed to a shaft 51 on which the sprocket wheel 46 is keyed and affords means for driving the conveyer 44.

In operation, the vines with bean pods are placed within the chute and fed forward from the platform against the cylinder and carried by the teeth of the latter through the concaves and as the pods are opened the beans will fall upon the screen 10 which is vibrated by the connections shown in Fig. 2 of the drawings. The beans and chaff falling upon the screen below are again subjected to a vibrating movement and falling upon the inclined bottom of the thresher will move by gravity downward and laterally to the space underneath the endless conveyer 40 where the beans separated from the chaff by the blower are elevated and fall into the trough 43 leading laterally from the threshing machine. The chaff and the pods are elevated by the conveyer 44 and discharged outside the rear end of the thresher as will be readily understood.

What I claim to be new is:

A bean thresher comprising a casing with threshing means, the bottom of the casing having its lowest point at one side of the longitudinal center thereof, with oppositely disposed walls inclined toward said lower point, vibrating screens mounted within the casing at one side of said lowest point of said casing, an inclined endless conveyer housing mounted at one side of said screens, said housing conforming to the contour of the lowest part of the inclined walls of the casing.

In testimony whereof I hereunto affix my signature.

LEONARD G. WILLGRUBS.